US012694591B2

(12) United States Patent
Xie et al.

(10) Patent No.: US 12,694,591 B2
(45) Date of Patent: Jul. 28, 2026

(54) FONT GENERATION METHOD, APPARATUS AND DEVICE

(71) Applicant: Beijing Youzhuju Network Technology Co., Ltd., Beijing (CN)

(72) Inventors: Rongchang Xie, Beijing (CN); Wen Zhou, Beijing (CN); Fan Zhang, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 204 days.

(21) Appl. No.: 18/728,796

(22) PCT Filed: Dec. 26, 2022

(86) PCT No.: PCT/CN2022/142066
§ 371 (c)(1),
(2) Date: Jul. 12, 2024

(87) PCT Pub. No.: WO2023/134433
PCT Pub. Date: Jul. 20, 2023

(65) Prior Publication Data
US 2025/0111558 A1 Apr. 3, 2025

(30) Foreign Application Priority Data

Jan. 14, 2022 (CN) ........................ 202210043722.X

(51) Int. Cl.
G06T 12/00 (2026.01)
(52) U.S. Cl.
CPC .................................... G06T 12/00 (2026.01)
(58) Field of Classification Search
None
See application file for complete search history.

(56) References Cited

U.S. PATENT DOCUMENTS

2021/0201548 A1 7/2021 Ozeki et al.
2022/0180043 A1* 6/2022 Tang ..................... G06F 40/109

FOREIGN PATENT DOCUMENTS

CN 110097615 A 8/2019
CN 112163401 A 1/2021
(Continued)

OTHER PUBLICATIONS

International Patent Application No. PCT/CN2022/142066; Int'l Search Report; dated Mar. 17, 2023; 2 pages.
(Continued)

*Primary Examiner* — Yanna Wu
(74) *Attorney, Agent, or Firm* — BakerHostetler

(57) ABSTRACT

The embodiments of the application disclose a method of font generation. When generating a new font, the method includes: obtaining a fifth character providing a font content and a character set providing font attributes, the character set including a sixth character and a seventh character, where a font attribute of the sixth character being different from a font attribute of the seventh character; inputting the fifth character, the sixth character, and the seventh character into a pretrained font generation network to obtain a target character, a font content of the target character being the font content provided by the fifth character, a font attribute of the target character being determined by the font attribute of the sixth character and the font attribute of the seventh character. In the application, since the training samples used when the font generation network is trained include the first character and the second character with different font attributes, the trained font generation network may accurately extract the font attributes of different characters and obtain new font attributes by interpolating different font attributes.

18 Claims, 3 Drawing Sheets

(56)             References Cited

FOREIGN PATENT DOCUMENTS

| | | | |
|---|---|---|---|
| CN | 112364860 | A | 2/2021 |
| CN | 113095038 | A | 7/2021 |
| CN | 113792853 | A | 12/2021 |
| CN | 113792855 | A | 12/2021 |
| CN | 114386370 | A | 4/2022 |
| JP | 2018-060418 | A | 4/2018 |

OTHER PUBLICATIONS

China Patent Application No. 202210043722.X; Office Action; dated May 28, 2024; 7 pages.
Zhang et al.; "A Unified Framework for Generalizable Style Transfer: Style and Content Separation"; IEEE Transactions on Image Processing; vol. 29; 2020; p. 4085-4098.

* cited by examiner

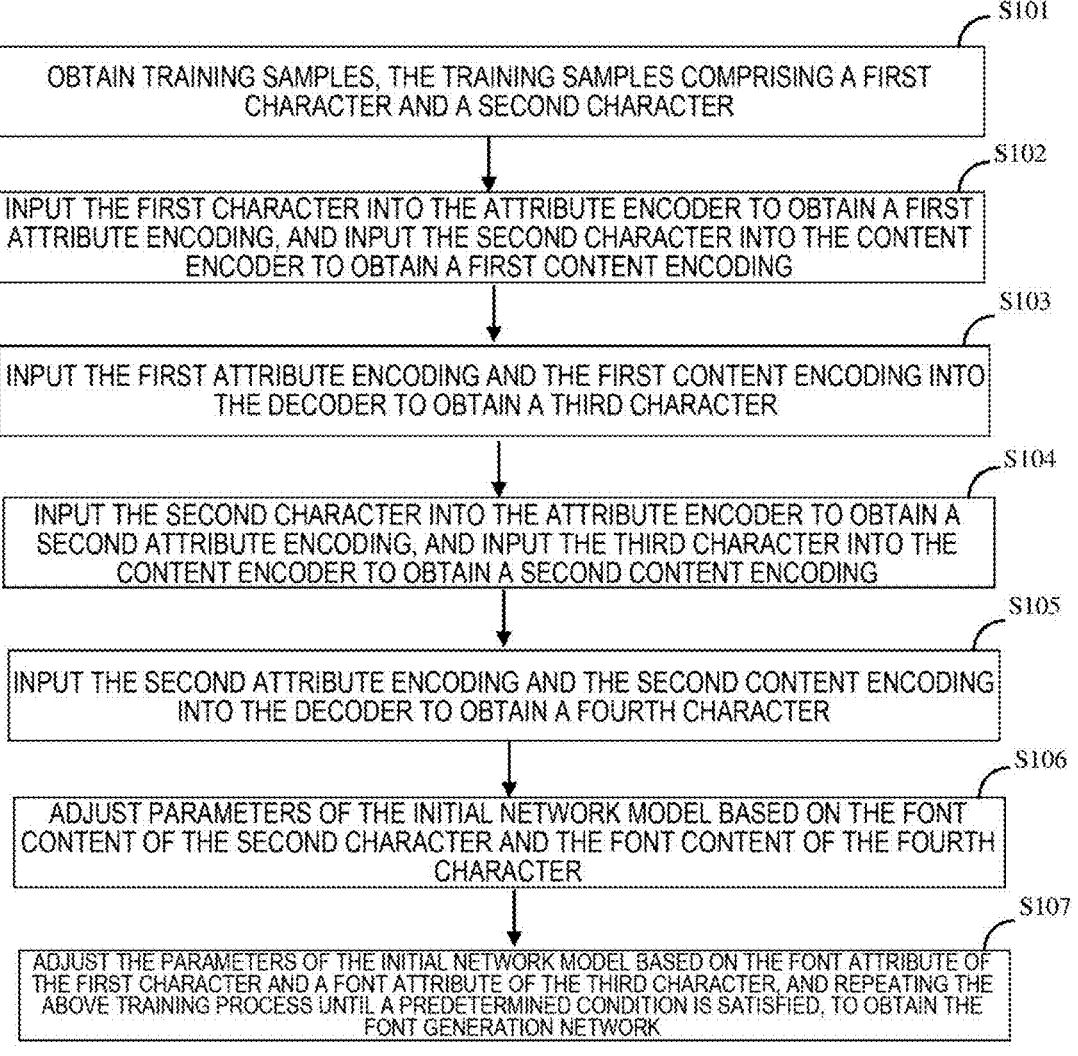

S101

OBTAIN TRAINING SAMPLES, THE TRAINING SAMPLES COMPRISING A FIRST
CHARACTER AND A SECOND CHARACTER

S102

INPUT THE FIRST CHARACTER INTO THE ATTRIBUTE ENCODER TO OBTAIN A FIRST
ATTRIBUTE ENCODING, AND INPUT THE SECOND CHARACTER INTO THE CONTENT
ENCODER TO OBTAIN A FIRST CONTENT ENCODING

S103

INPUT THE FIRST ATTRIBUTE ENCODING AND THE FIRST CONTENT ENCODING INTO
THE DECODER TO OBTAIN A THIRD CHARACTER

S104

INPUT THE SECOND CHARACTER INTO THE ATTRIBUTE ENCODER TO OBTAIN A
SECOND ATTRIBUTE ENCODING, AND INPUT THE THIRD CHARACTER INTO THE
CONTENT ENCODER TO OBTAIN A SECOND CONTENT ENCODING

S105

INPUT THE SECOND ATTRIBUTE ENCODING AND THE SECOND CONTENT ENCODING
INTO THE DECODER TO OBTAIN A FOURTH CHARACTER

S106

ADJUST PARAMETERS OF THE INITIAL NETWORK MODEL BASED ON THE FONT
CONTENT OF THE SECOND CHARACTER AND THE FONT CONTENT OF THE FOURTH
CHARACTER

S107

ADJUST THE PARAMETERS OF THE INITIAL NETWORK MODEL BASED ON THE FONT ATTRIBUTE OF
THE FIRST CHARACTER AND A FONT ATTRIBUTE OF THE THIRD CHARACTER, AND REPEATING THE
ABOVE TRAINING PROCESS UNTIL A PREDETERMINED CONDITION IS SATISFIED, TO OBTAIN THE
FONT GENERATION NETWORK

FIG. 1

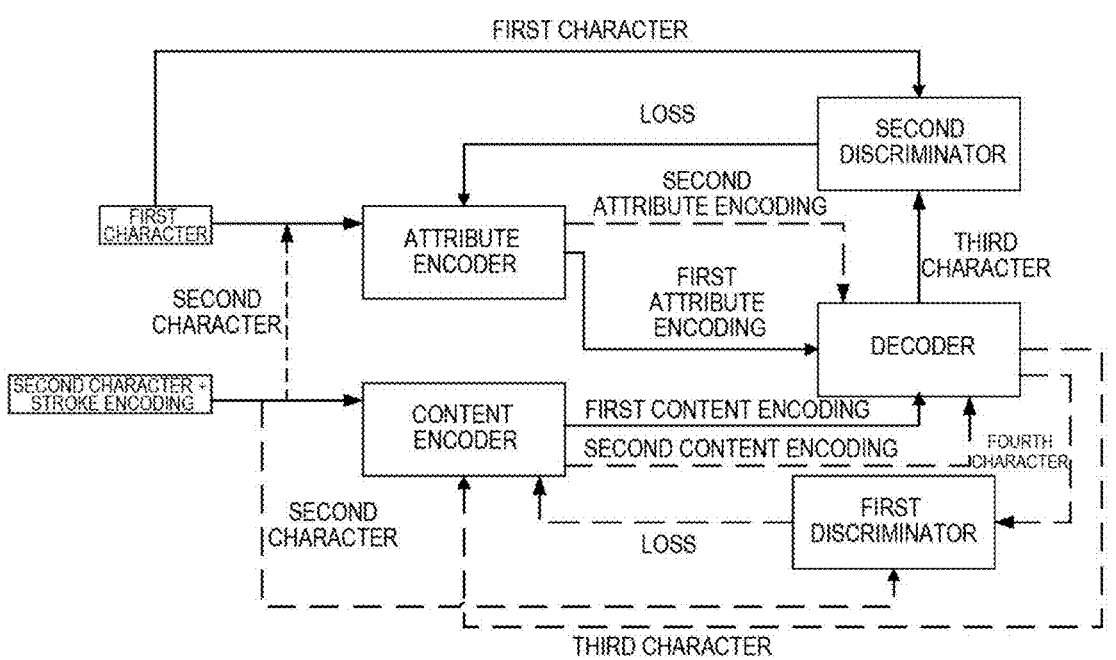

FIG. 2

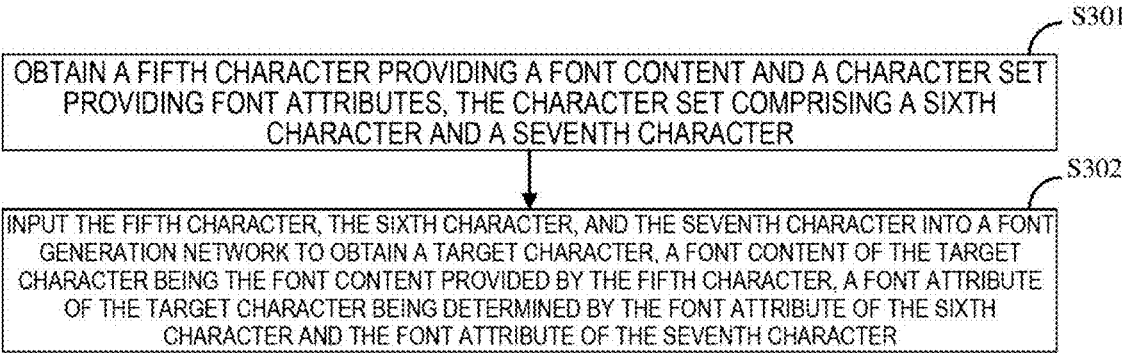

OBTAIN A FIFTH CHARACTER PROVIDING A FONT CONTENT AND A CHARACTER SET PROVIDING FONT ATTRIBUTES, THE CHARACTER SET COMPRISING A SIXTH CHARACTER AND A SEVENTH CHARACTER — S301

INPUT THE FIFTH CHARACTER, THE SIXTH CHARACTER, AND THE SEVENTH CHARACTER INTO A FONT GENERATION NETWORK TO OBTAIN A TARGET CHARACTER, A FONT CONTENT OF THE TARGET CHARACTER BEING THE FONT CONTENT PROVIDED BY THE FIFTH CHARACTER, A FONT ATTRIBUTE OF THE TARGET CHARACTER BEING DETERMINED BY THE FONT ATTRIBUTE OF THE SIXTH CHARACTER AND THE FONT ATTRIBUTE OF THE SEVENTH CHARACTER — S302

FIG. 3

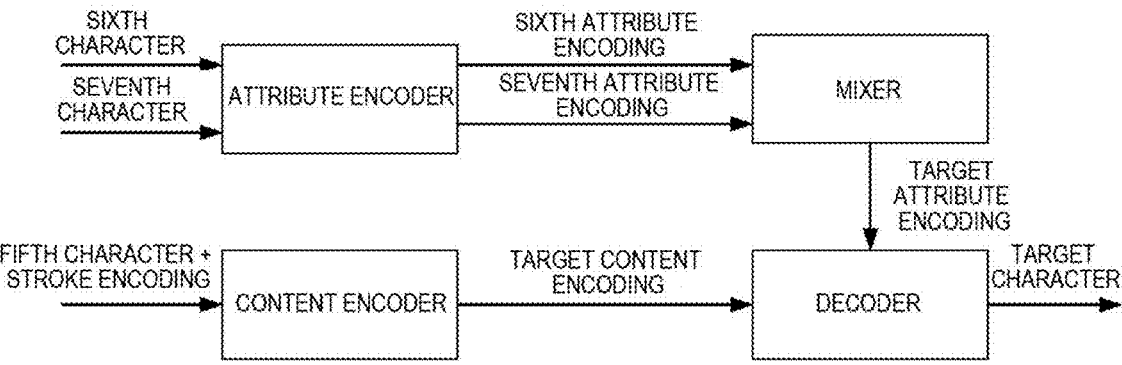

FIG. 4

FONT GENERATION METHOD, APPARATUS AND DEVICE

This disclosure is the U.S. National Stage of International Application No. PCT/CN2022/142066, filed on Dec. 26, 2022, which claims priority to Chinese Patent Application No. 202210043722.X, filed Jan. 14, 2022, and entitled "A FONT GENERATION METHOD, APPARATUSDEVICE AND DEVICEE", which are incorporated herein by reference in their entireties.

FIELD

This application relates to computer technical field, and specifically to a font generation method, an apparatus and a device.

BACKGROUND

In fields personalized advertising and personalized content recommendations, fonts with unique styles are often used to express user personality. The diversity and richness of fonts have also attracted attention of users and advertisers. A font is often determined by a variety of attributes of a word when it is visualized. The attributes include but are not limited to an outline of a word, a thickness of the word, a stroke of the word, etc. Through the permutation and combination of attributes, a variety of fonts may be generated.

The generation of new fonts often requires designers to design. But it is expensive and takes a long time to require designers to design.

SUMMARY

In view of the above, embodiments of the present application provide a font generation method, apparatus and device to implement the generation of new fonts and improve efficiency of font generation.

In order to achieve the above purpose, the technical solutions provided by the embodiments of the present application are as follows.

In a first aspect, embodiments of the present application, a font generation method is provided, which method includes:

obtaining a fifth character providing a font content and a character set providing font attributes, the character set comprising a sixth character and a seventh character, a font attribute of the sixth character being different from a font attribute of the seventh character, and a font attribute is configured to characterize a style of a font;

inputting the fifth character, the sixth character, and the seventh character into a font generation network to obtain a target character, a font content of the target character being the font content provided by the fifth character, a font attribute of the target character being determined by the font attribute of the sixth character and the font attribute of the seventh character;

wherein the font generation network is generated using training samples, the training samples comprise a first character and a second character, and a font attribute of the first character is different from a font attribute of the second character.

In a second aspect, embodiments of the present application provide a font generation apparatus. The apparatus comprises:

an obtaining unit configured to obtain a fifth character providing a font content and a character set providing font attributes, the character set comprising a sixth character and a seventh character, a font attribute of the sixth character being different from a font attribute of the seventh character, and a font attribute is configured to represent a style of a font;

a generation unit configured to input the fifth character, the sixth character, and the seventh character into a font generation network to obtain a target character, a font content of the target character being the font content provided by the fifth character, a font attribute of the target character being determined by the font attribute of the sixth character and the font attribute of the seventh character;

wherein the font generation network is generated using training samples, the training samples comprise a first character and a second character, and a font attribute of the first character is different from a font attribute of the second character.

In a third aspect, embodiments of the present application provide an electronic device. The device comprises: a processor and a memory;

the memory is configured to store instructions or a computer program;

the processor is configured to execute the instructions or the computer program in the memory, to cause the electronic device to perform the method of font generation described in the first aspect.

In a fourth aspect, embodiments of the present application provide a computer-readable storage medium. The computer-readable storage medium has instructions stored thereon which, when run on a device, cause the device to perform the method of font generation described in the first aspect.

In a fifth aspect, embodiments of the present application provide a computer program product. The computer program product, when executed on a computer, causes the computer to perform the method of font generation described in the first aspect.

It can be seen that the embodiments of the present application have the following beneficial effects.

The embodiments of the present application disclose a method of font generation. When generating a new font, the method includes: obtaining a fifth character providing a font content and a character set providing font attributes, the character set including a sixth character and a seventh character, where a font attribute of the sixth character being different from a font attribute of the seventh character, and a font attribute is configured to characterize a style of a font; inputting the fifth character, the sixth character, and the seventh character into a pretrained font generation network to obtain a target character, a font content of the target character being the font content provided by the fifth character, a font attribute of the target character being determined by the font attribute of the sixth character and the font attribute of the seventh character. That is, the font generation network may extract respective font attributes from the sixth character and the seventh character, and use the two font attributes to generate a new font attribute, and then use the new font attribute to generate the target character. In the present application, since the training samples used when the font generation network is trained include the first character and the second character with different font attributes, the trained font generation network may accurately extract the font attributes of different characters and obtain new font attributes by interpolating different font attributes.

BRIEF DESCRIPTION OF THE DRAWINGS

In order to more clearly illustrate the embodiments of the present application or the technical solutions in the prior art, the drawings needed to be used in the description of the embodiments or the prior art will be briefly introduced below. Obviously, the drawings in the following description are only for the purpose of describing the embodiments or the prior art. For some of the embodiments recorded in the application, those of ordinary skill in the art can also obtain other drawings based on these drawings without exerting creative efforts.

FIG. 1 is a flow chart of a font generation network training method provided by embodiments of the application;

FIG. 2 is a font generation network framework diagram provided by embodiments of the present application;

FIG. 3 is a flow chart of a font generation method provided by embodiments of the present application;

FIG. 4 is another font generation network framework diagram provided by embodiments of the present application;

DETAILED DESCRIPTION

Figure 5:
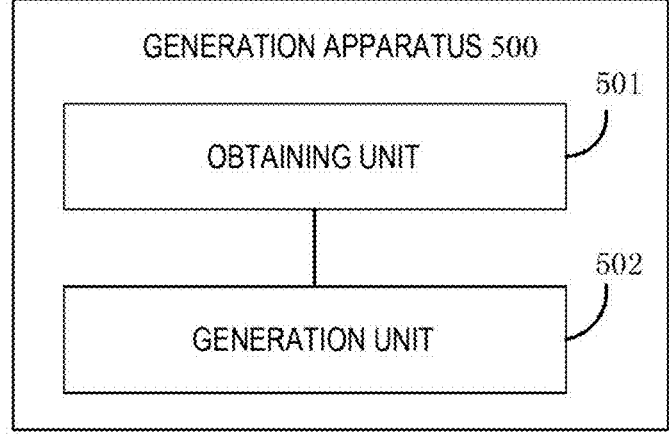
FIG. 5 is a schematic structural diagram of a font generation apparatus provided by embodiments of the present application.

In order to enable the personnel of this field to better understand the solution of this application, the technical solutions in the embodiments of this application will be clearly and completely described below in conjunction with the drawings in the embodiments of this application. Obviously, the described embodiments are only a part of this application embodiments, not all embodiments. Based on the embodiments in this application, all other embodiments obtained by those of ordinary skill in the art without creative efforts fall within the scope of protection of this application.

In order to facilitate understanding of the technical solutions provided by the embodiments of this application, the technical terms involved in this application will be explained below.

Font refers to external formal characteristics of a word, that is, a style of a word. Usually, generation of a font goes through a creative design of a font designer and a stroke-by-stroke design and modification of a font design staff. For example, it includes seal script, clerical script, regular script, cursive script, Song typeface, blackface, etc.

Currently, a common use is font style conversion, that is, converting one font style into another font style. For example, Generative Adversarial Networks (GAN) is used to achieve style transfer. However, font style conversion may only achieve convertion between existing fonts and may not generate new fonts. The generation of new fonts must rely on designers to spend time and energy, which increases design costs.

Based on this, embodiments of the present application provide a font generation method. Through training, the font generation network may decouple and encode a font content and a font attribute of a character, and then interpolate attribute encodings of different fonts to obtain new attribute encodings and then generate a new font based on the new attribute encodings and content encodings.

It should be noted that usually, a font is determined by a plurality of font attributes. A font attribute may include outline, thickness, stroke of a character, etc. Font content refers to a content with the font, i.e., the specific character, for example, "medium" in the font of regular script is considered as having the font content of "medium".

Based on the above description, a font generation network training method provided by embodiments of the present application will be described below in conjunction with the accompanying drawings.

Reference is made to FIG. 1 which is a flow chart of a font generation network training method provided by embodiments of the present application. The initial network model corresponding to the font generation network includes an attribute encoder, a content encoder and a decoder. As shown in FIG. 1, the method may include:

S101: obtaining training samples including the first character and the second character.

In the embodiment, in order to make the trained font generation network more accurate, a large number of training samples may be obtained, and the training samples may include the first character and the second character. The first character may provide a font attribute during training, and the second character may provide a font content during training. The font attribute of the first character is different from the font attribute of the second character, and the font content of the first character is also different from the font content of the second character. For example, the first character is "you" in the font of Song typeface, and the second character is "good" in the font of regular script. During training, the first character provides the font attributes of Song typeface, and the second character provides the content of "good".

S102: inputting the first character into the attribute encoder to obtain a first attribute encoding, and inputting the second character into the content encoder to obtain a first content encoding.

After obtaining the training samples, the first character is input into the attribute encoder as an input parameter to obtain the first attribute encoding corresponding to the font of the first character, and the second character is input into the content encoder as an input parameter to obtain the font content of the second character, that is, the second content encoding. The first attribute is encoded as a font attribute feature vector of the first character, which may represent the font of the first character. For example, the first attribute encoding is used to represent that the font of the first character is Songtypeface. The first content encoding is a font content feature vector of the second character, which can represent the specific content of the second character. For example, the first content encoding is used to represent the second character as "good".

Optionally, in order to improve a coding accuracy of the content encoder and avoid a loss of strokes during the encoding process, when encoding the second character, the stroke information corresponding to the second character may also be input into the content encoder as an input parameter. Therefore, the first content encoding output by the content encoder may accurately characterize the second character. Specifically, the second character and a stroke encoding corresponding to the second character are input into the content encoder to obtain the first content encoding, the stroke encoding characterizing a radical comprised in the second character.

A stroke is a smallest unit included in Chinese characters, and each character include several radicals. The stroke encoding is an encoding vector corresponding to a certain word. If it includes a certain radical, the corresponding encoding value is set to 1, otherwise it is set to 0. For example, if there are 32 radicals in total, the strokes are encoded as a 32-dimensional encoding vector.

S103: inputting the first attribute encoding and the first content encoding into the decoder to obtain a third character.

After obtaining the first attribute encoding and the first content encoding, they are input into the decoder as input parameters, and the third character is obtained through the decoding operation. The font of the third character output by the decoder is the font of the first character, and the font content is the content of the second character. For example, if the first character is "you" in the font of Song typeface, and the second character is "good" in the font of regular script, then the third character is "good" in the font of Song typeface.

Optionally, in order to make the font attribute of the generated third character closer to the font attribute of the first character, the first character (attribute word) and the second character (content word) can also be divided into partitions, and each character of the content word can be divided into partitions to find attribute word partitions similar to this partition, so that partition decoding may be performed during decoding. Specifically, character segmentation is performed on the first character and the second character to obtain a plurality of first partitions corresponding to the first character and a plurality of second partitions corresponding to the second character. For any second partition, a first partition that matching the second partition is determined from the plurality of first partitions corresponding to the first character. For any second partition, a content encoding of the second partition and a attribute encoding of the first partition matching the second partition are input into the decoder to obtain the third character. A connected domain segmentation algorithm may be used to segment the first character and the second character. For example, the first character is divided into partition 11, partition 12, and partition 13, and the second character is divided into partition 21, partition 22, partition 23, and partition 24. For the four partitions divided by the second character, the first character is divided into four partitions. Similar partitions are found for each partition of the second character in the three divided partitions, and then the decoder decodes based on the matched pair of partitions, thereby improving decoding accuracy.

S104: inputting the second character into the attribute encoder to obtain a second attribute encoding, and inputting the third character into the content encoder to obtain a second content encoding.

In this embodiment, the second character is input into the attribute encoder as an input parameter to obtain the second attribute encoding corresponding to the font of the second character, and the third character is input into the content encoder as an input parameter to obtain the font content of the third character, that is second content encoding. For example, if the second character is "good" in the font of regular script, and the third character is "good" in the font of Song type, then the second attribute encoding is used to characterize that the character attribute of the second character is regular script, and the second content encoding is used to characterize that the font content of the third character is "good".

Optionally, when performing content encoding on the third character, the third character and the stroke encoding corresponding to the third character are input into the content encoder to obtain the second content encoding.

S105: inputting the second attribute encoding and the second content encoding into the decoder to obtain a fourth character.

The second attribute encoding corresponding to the second character and the second content encoding corresponding to the third character are input into the decoder as input parameters, and the fourth character is obtained through the decoding operation. That is, the original content word is reconstructed by using the generated word (the third character) as the content word and the original content word (the second character) as the attribute word. For example, if the first character is "you" in the font of Song type and the second character is "good" in the font of regular script style, then the generated character is the third character, i.e., "good" in the font of Song typeface, and the reconstructed fourth character is "good" in the font of regular script.

S106: adjusting the parameters of the initial network model based on the font attribute of the first character and a font attribute of the third character.

After the fourth character is obtained, the parameters of the initial network model are adjusted based on the difference between the font content of the second character and the font content of the fourth character. Specifically, parameters of the content encoder in the initial network model are adjusted based on the font content of the second character and the font content of the fourth character to improve the coding accuracy of the content encoder.

Optionally, the second character and the fourth character are input into a first discriminator, and the parameters of the initial network model are adjusted based on a discrimination result of the first discriminator, the first discriminator being configured to discriminate a difference between the font content of the second character and the font content of the fourth character. A discriminant loss function may be obtained through the first discriminator, and the discriminant loss function is used to adjust the parameters of the initial network model.

Optionally, in order to further improve the coding accuracy of the content encoder, the parameters of the initial network model may also be adjusted based on the difference between the stroke ecoding corresponding to the third character and the stroke ecoding corresponding to the second character. Specifically, the third character is input into the stroke classifier to obtain the first stroke encoding; the parameters of the initial network model are adjusted according to the first stroke encoding and the second stroke encoding corresponding to the second character. For example, the first stroke encoding and the second stroke encoding are input into the third discriminator, and the parameters of the content encoder are adjusted according to the discrimination result of the third discriminator. The third discriminator is used to identify the difference between the first stroke encoding and the second stroke encoding.

S107: adjusting the parameters of the initial network model based on the font attribute of the first character and a font attribute of the third character, and repeating the above training process until a predetermined condition is satisfied, to obtain the font generation network.

In the embodiment, the parameters of the initial network model are adjusted by using the difference between the font attributes of the first character and the font attributes of the third character. Specifically, the parameters of the attribute encoder in the initial network model are adjusted based on the font attributes of the first character and the font attributes of the third character to improve the coding accuracy of the attribute encoder.

Optionally, the first character and the third character are input into a second discriminator, and the parameters of the initial network model are adjusted based on a discrimination result of the second discriminator, the second discriminator being configured to discriminate difference between the font attribute of the second character and the font attribute of the fourth character, and the discrimination loss function is obtained through the second discriminator, so as to use the discrimination loss function to adjust the parameters of the attribute encoder.

After adjusting the parameters of the initial network model based on S106 and S107, the training processes of S102 to S107 are re-executed until the predetermined conditions are met, and the font generation network is obtained. The predetermined condition may be set according to an actual situation, for example, the discrimination loss function of the first discriminator is less than the first predetermined threshold and/or the discrimination loss function of the second discriminator is less than the second predetermined threshold, etc.

It should be noted that an execution order of S106 and S107 in this embodiment is not limited by the above. S107 may also be executed first and then S106, or S106 and S107 can be executed at the same time. The execution order of S107 and S104-S106 is not limited to the above. S107 may be executed first, and then S104-S106 may be executed, or S107 and S104-S106 may be executed at the same time.

It can be seen that when training the font generation network, training samples including a first character and a second character are obtained, the first character is used to provide font attributes, and the second character is used to provide font content. The first character is input into the attribute encoder of the initial network model to obtain the first attribute encoding, and the second character is input into the content encoder of the initial network model to obtain the first content encoding. The first attribute encoding and the first content encoding are input into the decoder of the initial network model to obtain the third character. The third character is input into the content encoder to obtain the second content encoding, and the second character is input into the attribute encoder to obtain the second attribute encoding. The second attribute encoding and the second content encoding are input into the decoder to obtain the fourth character. The parameters of the initial network model are adjusted based on the font content of the second character and the font content of the fourth character, and the parameters of the initial network model are adjusted based on the font attributes of the first character and the font attributes of the third character. After adjustment, the above training processes are re-executed until the predetermined jump instructions are satisfied and the font generation network is obtained. The parameters of the initial network model are adjusted based on the font content of the second character and the font content of the fourth character, the content encoder is mainly adjusted, so that the content encoder may accurately encode the content of the input character. Based on the font attributes of the first character and the font attributes of the third character, the parameters of the initial network model are mainly adjusted to adjust the attribute encoder so that the attribute encoder may input the attributes of the character for accurate encoding. Through the above training, the attribute encoder and content encoder are decoupled.

Referring to the initial network model architecture diagram shown in FIG. 2, the initial network model includes an attribute encoder, a content encoder, a decoder, a first discriminator and a second discriminator. The first character is inputted into the attribute encoder to obtain the first attribute encoding, and the second character and stroke encodings are input into the content encoder to obtain the first content encoding. The decoder performs a decoding operation on the first attribute encoding and the first content encoding to obtain the third character.

Then the second character is inputted into the attribute encoder to obtain the second attribute encoding, and the third character and stroke encoding are inputted into the content encoder to obtain the second content encoding. The decoder performs a decoding operation based on the second attribute encoding and the second content encoding to obtain the fourth character.

The first and third characters are fed into the second discriminator and the obtained loss is fed back to the attribute encoder. The second character and the fourth character are input to the first discriminator and the obtained loss is fed back to the content encoder.

Based on the font generation network generated by the above training, this font generation network will be used to generate new fonts.

Reference is made to FIG. 3 which is a flow chart of a font generation method provided by embodiments of the present application. As shown in FIG. 3, the method may include:

S301: obtaining a fifth character providing a font content and a character set providing font attributes, the character set comprising a sixth character and a seventh character, a font attribute of the sixth character being different from a font attribute of the seventh character, and a font attribute is configured to characterize a style of a font.

In the embodiments, in order to obtain new fonts, the fifth character and the character set are obtained. The fifth character is used to provide font content, and the characters in the character set are used to provide font attributes. The character set may include a plurality of characters with different font attributes, and the font attributes may characterize a style of a font.

S302: inputting the fifth character, the sixth character, and the seventh character into a font generation network to obtain a target character.

After obtaining the fifth character providing font content and the sixth and seventh characters providing font attributes, the above characters are input into the font generation network to obtain the target character through the font generation network. The font content of the target character is the font content provided by the fifth character, the font attribute of the target character is determined by the font attribute of the sixth character and the font attribute of the seventh character, and the font attribute of the target character are different from the font attribute of the sixth character and the font attribute of the seventh character.

From the above, it can be seen that the font generation network may include an attribute encoder and a content encoder. After obtaining the fifth, sixth, and seventh characters, the font generation network may use the attribute encoder and the content encoder to encode the above characters, respectively. Processing may include the following steps:

1): The sixth character and the seventh character are input into the attribute encoder of the font generation network to obtain the sixth attribute encoding and the seventh attribute encoding, respectively.

2): The sixth attribute encoding and the seventh attribute encoding are mixed to obtain the target attribute encoding.

In this embodiment, the sixth character and seventh character providing font attributes are input into the attribute encoder of the font generation network to obtain the sixth attribute encoding corresponding to the first character and the seventh attribute encoding corresponding to the seventh character. Then, the target attribute encoding is obtained by mixing the sixth attribute encoding and the seventh attribute encoding, and the target attribute encoding is used to characterize the new font attribute. Specifically, the sixth attribute encoding and the seventh attribute encoding are input into the mixer of the font generation network to obtain the target attribute encoding. The mixer may mix the sixth attribute encoding and the seventh attribute encoding in a weighted manner to obtain the target attribute encoding.

3): The fifth character is input into the content encoder of the font generation network to obtain the target content encoding.

Optionally, when obtaining the content encoding corresponding to the fifth character, the fifth character and the stroke encoding corresponding to the fifth character may be input into the content encoder, so that the target content encoding output by the content encoder is more accurate.

4): The target attribute encoding and the target content encoding are inputted into the decoder of the font generation network to obtain the target character.

When the decoder decodes the target attribute encoding and the target content encoding to generate the target characters, it can use the SPADE method to decode to strengthen the intensity of the target attribute encoding and make the font attributes of the generated target characters more significant.

It can be seen that after the attribute encoder and content encoder in the font generation network are decoupled, the attribute encoder may be used to extract the attribute encoding of the sixth character and the attribute encoding of the seventh character, and obtain new target attributes through interpolation. The new target attribute encoding represents the new font. After decoding the target attribute encoding and the target content encoding, the new font is obtained.

Referring to the scene graph shown in FIG. 4, the font generation network includes an attribute encoder, a content encoder, a decoder and a mixer. The fifth character and the stroke encoding are input into the content encoder to obtain the target content encoding, and the sixth character and the seventh character are input into the attribute encoding to obtain the sixth attribute encoding and the seventh attribute encoding, and the target attribute encoding is obtained through the mixer. The decoder obtains the target word character by decoding the target content encoding and the target attribute encoding.

Based on the above method embodiments, this application embodiments provides a font generation apparatus and device, which will be described below with reference to the accompanying drawings.

Reference is made to FIG. 5, FIG. 5 is a structural diagram of a font generation apparatus provided by embodiments of the present application. As shown in FIG. 5, the apparatus may include: an obtaining unit 501 and a generation unit 502.

The obtaining unit 501 is configured to obtain a fifth character providing a font content and a character set providing font attributes, the character set comprising a sixth character and a seventh character, a font attribute of the sixth character being different from a font attribute of the seventh character, and a font attribute is configured to represent a style of a font;

the generation unit 502 is configured to input the fifth character, the sixth character, and the seventh character into a font generation network to obtain a target character, a font content of the target character being the font content provided by the fifth character, a font attribute of the target character being determined by the font attribute of the sixth character and the font attribute of the seventh character;

wherein the font generation network is generated using training samples, the training samples comprise a first character and a second character, and a font attribute of the first character is different from a font attribute of the second character.

The font generation network is generated using training samples, the training samples comprise a first character and a second character, and a font attribute of the first character is different from a font attribute of the second character.

In a specific implementation, the apparatus further includes: a training unit;

the training unit is configured to, input the first character into the attribute encoder to obtain a first attribute encoding, and input the second character into the content encoder to obtain a first content encoding; inputting the first attribute encoding and the first content encoding into the decoder to obtain a third character; input the second character into the attribute encoder to obtain a second attribute encoding, and input the third character into the content encoder to obtain a second content encoding; input the second attribute encoding and the second content encoding into the decoder to obtain a fourth character; adjust parameters of the initial network model based on the font content of the second character and the font content of the fourth character; adjust the parameters of the initial network model based on the font attribute of the first character and a font attribute of the third character, and repeating the above training process until a predetermined condition is satisfied, to obtain the font generation network.

In a specific implementation, the training unit is specifically configured to input the second character and a stroke encoding corresponding to the second character into the content encoder to obtain the first content encoding, the stroke encoding characterizing a radical comprised in the second character.

In a specific implementation, the training unit is specifically configured to input the second character and the fourth character into a first discriminator, and adjusting the parameters of the initial network model based on a discrimination result of the first discriminator, the first discriminator being configured to discriminate a difference between the font content of the second character and the font content of the fourth character.

In a specific implementation, the training unit is specifically configured to input the first character and the third character into a second discriminator, and adjusting the parameters of the initial network model based on a discrimination result of the second discriminator, the second discriminator being configured to discriminate difference between the font attribute of the second character and the font attribute of the fourth character.

In a specific implementation, the training unit is also configured to input the third character into a stroke classifier to obtain the first stroke encoding; and adjust the parameters of the initial network model based on the first stroke encoding and a second stroke encoding corresponding to the second character.

In a specific implementation manner, the training unit is specifically configured to perform character segmentation on the first character and the second character to obtain a plurality of first partitions corresponding to the first character and a plurality of second partitions corresponding to the second character; determine, for any second partition, a first partition that matching the second partition from the plurality of first partitions corresponding to the first character;

input, for any second partition, a content encoding of the second partition and a attribute encoding of the first partition matching the second partition into the decoder to obtain the third character.

In a specific implementation, the generation unit is specifically configured to input the sixth character and the seventh character into the attribute encoder of the font generation network to obtain a sixth attribute encoding and a seventh attribute encoding, respectively; mix the sixth attribute encoding and the seventh attribute encoding to obtain a target attribute encoding, the target attribute encoding characterizing a new font attribute; input the fifth character into the content encoder of the font generation network to obtain a target content encoding; input the target attribute encoding and the target content encoding into the decoder of the font generation network to obtain the target character.

In a specific implementation, the generation unit is specifically configured to input the fifth character and the stroke encoding of the fifth character into the content encoder of the font generation network to obtain the target content encoding.

In a specific implementation, the generation unit is specifically configured to input the sixth attribute encoding and the seventh attribute encoding into a mixer of the font generation network to obtain the target attribute encoding.

It should be noted that the implementation of each unit in the embodiment may be found in the above method embodiments, and this embodiment will not be described in detail here.

Figure 6:
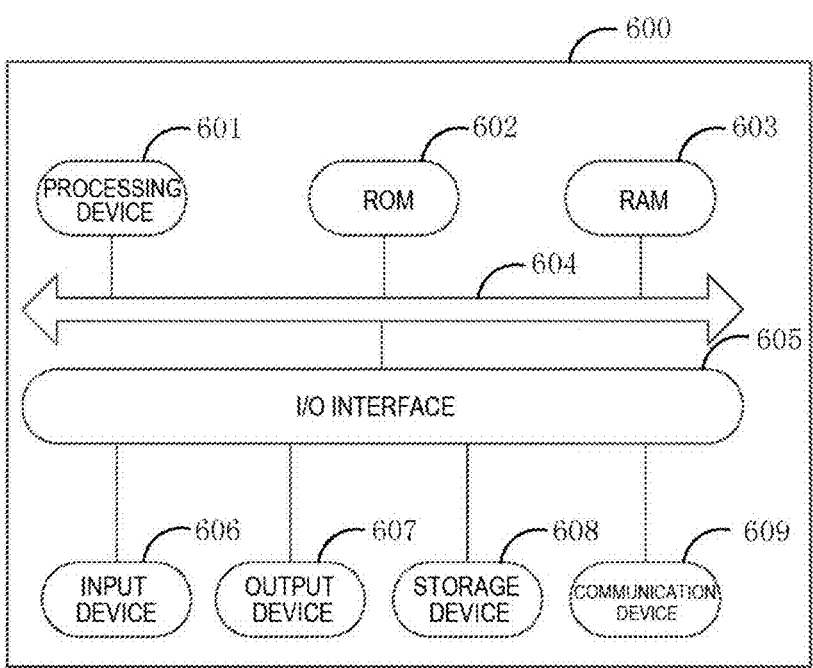
FIG. 6 is a schematic structural diagram of an electronic device provided by embodiments of the present application.

Referring to FIG. 6, a schematic structural diagram of an electronic device 600 suitable for implementing embodiments of the present application is shown. Terminal devices in the embodiments of this application may include, but are not limited to, mobile phones, notebook computers, digital broadcast receivers, PDA (Personal Digital Assistant, personal digital assistant), PAD (portable android device, tablet computer), PMP (Portable Media Player, portable multimedia players), vehicle-mounted terminals (such as vehicle-mounted navigation terminals), etc., as well as fixed terminals such as digital TV (television, television), desktop computers, etc. The electronic device shown in FIG. 6 is only an example, and should not bring any limitations to the functions and usage scope of the embodiments of this application.

As shown in FIG. 6, the electronic device 600 may include a processing device (eg, central processing unit, graphics processor, etc.) 601, which may be loaded into a random access device according to a program stored in a read-only memory (ROM) 602 or from a storage device 608. The program in the memory (RAM) 603 executes various appropriate actions and processes. In the RAM 603, various programs and data required for the operation of the electronic device 600 are also stored. The processing device 601, ROM 602 and RAM 603 are connected to each other via a bus 604. An input/output (I/O) interface 605 is also connected to bus 604.

Generally, the following devices may be connected to the I/O interface 605: input devices 606 including, for example, a touch screen, touch pad, keyboard, mouse, camera, microphone, accelerometer, gyroscope, etc.; including, for example, a liquid crystal display (LCD), speaker, vibration An output device 607 such as a computer; a storage device 608 including a magnetic tape, a hard disk, etc.; and a communication device 609. Communication device 609 may allow electronic device 600 to communicate wirelessly or wiredly with other devices to exchange data. Although FIG. 6 illustrates electronic device 600 with various means, it should be understood that implementation or availability of all illustrated means is not required. More or fewer means may alternatively be implemented or provided.

In particular, according to embodiments of the present application, the processes described above with reference to the flowcharts may be implemented as computer software programs. For example, embodiments of the present application include a computer program product, which includes a computer program carried on a non-transitory computer-readable medium, and the computer program includes program code for executing the method shown in the flowchart. In such embodiments, the computer program may be downloaded and installed from the network via the communication device 609, or from the storage device 608, or from the ROM 602. When the computer program is executed by the processing device 601, the above-mentioned functions defined in the method of embodiments of the present application are executed.

The electronic device provided by the embodiments of this application and the font generation method provided by the above embodiments belong to the same inventive concept. Technical details not described in detail in this embodiment can be found in the above embodiments, and this embodiment has the same beneficial effects as the above embodiments.

The embodiments of this application provide a computer-readable medium on which a computer program is stored, wherein when the program is executed by a processor, the font generation method as described in any of the above embodiments is implemented.

It should be noted that the computer-readable medium mentioned above in this application may be a computer-readable signal medium or a computer-readable storage medium, or any combination of the above two. The computer-readable storage medium may be, for example, but is not limited to, an electrical, magnetic, optical, electromagnetic, infrared, or semiconductor system, apparatus or device, or any combination thereof. More specific examples of computer readable storage media may include, but are not limited to: an electrical connection having one or more wires, a portable computer disk, a hard drive, random access memory (RAM), read only memory (ROM), removable memory Programmable read-only memory (EPROM or flash memory), optical fiber, portable compact disk read-only memory (CD-ROM), optical storage device, magnetic storage device, or any suitable combination of the above. As used herein, a computer-readable storage medium may be any tangible medium that contains or stores a program for use by or in connection with an instruction execution system, apparatus, or device. In this application, the computer-readable signal medium may include a data signal propagated in baseband or as part of a carrier wave, in which computer-readable program code is carried. Such propagated data signals may take many forms, including but not limited to electromagnetic signals, optical signals, or any suitable combination of the above. A computer-readable signal medium may also be any computer-readable medium other than a computer-readable storage medium that can send, propagate, or transmit a program for use by or in connection with an instruction execution system, apparatus, or device. Program code embodied on a computer-readable medium may be transmitted using any suitable medium, including but not limited to: wire, optical fiber cable, RF (radio frequency), etc., or any suitable combination of the foregoing.

In some embodiments, the client and server can communicate using any currently known or future developed network protocol such as HTTP (Hyper Text Transfer Protocol), and can communicate with digital data in any form or medium. Data communications (e.g., communications networks) interconnections. Examples of communications networks include local area networks ("LAN"), wide area networks ("WAN"), the Internet (e.g., the Internet), and end-to-end networks (e.g., ad hoc end-to-end networks), as well as any currently known or developed in the future network of.

The above-mentioned computer-readable medium may be included in the above-mentioned electronic device; it may also exist independently without being assembled into the electronic device.

The computer-readable medium carries one or more programs. When the one or more programs are executed by the electronic device, the electronic device executes the font generation method.

Computer program code for performing the operations of the present application may be written in one or more programming languages, including, but not limited to, object-oriented programming languages—such as Java, Smalltalk, C++, and Includes conventional procedural programming languages-such as "C" or similar programming languages. The program code may execute entirely on the user's computer, partly on the user's computer, as a stand-alone software package, partly on the user's computer and partly on a remote computer or entirely on the remote computer or server. In situations involving remote computers, the remote computer can be connected to the user's computer through any kind of network, including a local area network (LAN) or a wide area network (WAN), or it can be connected to an external computer (such as an Internet service provider through Internet connection).

The flowcharts and block diagrams in the accompanying drawings illustrate the possible architecture, functions and operations of the systems, methods and computer program products according to the various embodiments of the present application. In this regard, each block in the flowchart or block diagram may represent a module, segment, or portion of code that contains one or more logic functions that implement the specified executable instructions. It should also be noted that, in some alternative implementations, the functions noted in the block may occur out of the order noted in the figures. For example, two blocks shown one after another may actually execute substantially in parallel, or they may sometimes execute in the reverse order, depending on the functionality involved. It will also be noted that each block of the block diagram and/or flowchart illustration, and combinations of blocks in the block diagram and/or flowchart illustration, can be implemented by special purpose hardware-based systems that perform the specified functions or operations, or can be implemented using a combination of specialized hardware and computer instructions.

The units involved in the embodiments described in this application can be implemented in software or hardware. The name of the unit/module does not constitute a limitation on the unit itself under certain circumstances. For example, the voice data collection module can also be described as a "data collection module".

The functions described above herein may be performed, at least in part, by one or more hardware logic components. For example, and without limitation, exemple types of hardware logic components that may be used include: Field Programmable Gate Arrays (FPGAs), Application Specific Integrated Circuits (ASICs), Application Specific Standard Products (ASSPs), Systems on Chips (SOCs), Complex Programmable Logical device (CPLD) and so on.

In the context of this application, a machine-readable medium may be a tangible medium that may contain or store a program for use by or in connection with an instruction execution system, apparatus, or device. The machine-readable medium may be a machine-readable signal medium or a machine-readable storage medium. Machine-readable media may include, but are not limited to, electronic, magnetic, optical, electromagnetic, infrared, or semiconductor systems, devices or devices, or any suitable combination of the foregoing. More specific examples of machine-readable storage media would include one or more wires based electrical connection, laptop disk, hard drive, random access memory (RAM), read only memory (ROM), erasable programmable read only memory (EPROM or flash memory), optical fiber, portable compact disk read-only memory (CD-ROM), optical storage device, magnetic storage device, or any suitable combination of the above.

It should be noted that each embodiment is described in a progressive manner in this manual. Each embodiment focuses on its differences from other embodiments. The same and similar parts between each embodiment can be referred to each other. For the system or device disclosed by embodiments, since it corresponds to the method disclosed by embodiments, the description is relatively simple. For relevant details, please refer to the description of the method section.

It should be understood that in this application, "at least one (item)" refers to one or more, and "plurality" refers to two or more. "And/or" is used to describe the relationship between associated objects, indicating that there can be three relationships. For example, "A and/or B" can mean: only A exists, only B exists, and A and B exist simultaneously, where A and B can be singular or plural. The character "/" generally indicates that the related objects are in an "or" relationship. "At least one of the following" or similar expressions thereof refers to any combination of these items, including any combination of a single item (items) or a plurality of items (items). For example, at least one item (item) of a, b or c can mean: a, b, c, "a and b", "a and c", "b and c", or "a and b and c", where a, b, c can be single or multiple.

It should also be noted that in this article, relational terms such as first and second are only used to distinguish one entity or operation from another entity or operation, and do not necessarily require or imply that these entities or operations There is no such actual relationship or sequence between them. Furthermore, the terms "comprises," or any other variations thereof are intended to cover a non-exclusive inclusion such that a process, method, article, or apparatus that includes a list of elements includes not only those elements, but also those not expressly listed other elements, or elements inherent to the process, method, article or equipment. Without further limitation, an element defined by the statement "comprises a . . . " does not exclude the presence of additional identical elements in a process, method, article, or apparatus that includes the stated element.

The steps of the methods or algorithms described in conjunction with the embodiments disclosed herein may be implemented directly in hardware, in software modules executed by a processor, or in a combination of the two. Software modules may be located in random access memory (RAM), memory, read-only memory (ROM), electrically programmable ROM, electrically erasable programmable ROM, registers, hard disks, removable disks, CD-ROMs, or FIELDs as they are known. any other form of storage media.

The above description of the disclosed embodiments enables those skilled in the art to implement or use the present application. Various modifications to these embodiments will be apparent to those skilled in the art, and the general principles defined herein may be implemented in other embodiments without departing from the spirit or scope of the application. Therefore, the present application is not to be limited to the embodiments shown herein but is to be accorded the widest scope consistent with the principles and novel features disclosed herein.

We claim:

1. A method of font generation, comprising:

obtaining a fifth character providing a font content and a character set providing font attributes, the character set comprising a sixth character and a seventh character, a font attribute of the sixth character being different from a font attribute of the seventh character, and a font attribute is configured to characterize a style of a font; and inputting the fifth character, the sixth character, and the seventh character into a font generation network to obtain a target character, a font content of the target character being the font content provided by the fifth character, a font attribute of the target character being determined by the font attribute of the sixth character and the font attribute of the seventh character;

wherein the font generation network is generated using training samples, the training samples comprise a first character and a second character, and a font attribute of the first character is different from a font attribute of the second character, wherein an initial network model corresponding to the font generation network comprises an attribute encoder, a content encoder, and a decoder, and a training process of the font generation network comprises:

inputting the first character into the attribute encoder to obtain a first attribute encoding, and inputting the second character into the content encoder to obtain a first content encoding, inputting the first attribute encoding and the first content encoding into the decoder to obtain a third character, inputting the second character into the attribute encoder to obtain a second attribute encoding, and inputting the third character into the content encoder to obtain a second content encoding, inputting the second attribute encoding and the second content encoding into the decoder to obtain a fourth character, adjusting parameters of the initial network model based on the font content of the second character and the font content of the fourth character, and adjusting the parameters of the initial network model based on the font attribute of the first character and a font attribute of the third character, and repeating the training process until a predetermined condition is satisfied to obtain the font generation network.

2. The method of claim 1, wherein inputting the second character into the content encoder to obtain the first content encoding comprises:

inputting the second character and a stroke encoding corresponding to the second character into the content encoder to obtain the first content encoding, the stroke encoding characterizing a radical comprised in the second character.

3. The method of claim 1, wherein adjusting parameters of the initial network model based on the font content of the second character and the font content of the fourth character comprises:

inputting the second character and the fourth character into a first discriminator, and adjusting the parameters of the initial network model based on a discrimination result of the first discriminator, the first discriminator being configured to discriminate a difference between the font content of the second character and the font content of the fourth character.

4. The method of claim 1, wherein adjusting the parameters of the initial network model based on the font attribute of the first character and the font attribute of the third character comprises:

inputting the first character and the third character into a second discriminator, and adjusting the parameters of the initial network model based on a discrimination result of the second discriminator, the second discriminator being configured to discriminate difference between the font attribute of the second character and the font attribute of the fourth character.

5. The method of claim 1, wherein the method further comprises:

inputting the third character into a stroke classifier to obtain the first stroke encoding; and adjusting the parameters of the initial network model based on the first stroke encoding and a second stroke encoding corresponding to the second character.

6. The method of claim 1, wherein inputting the first attribute encoding and the first content encoding into the decoder to obtain the third character comprises:

performing character segmentation on the first character and the second character to obtain a plurality of first partitions corresponding to the first character and a plurality of second partitions corresponding to the second character;

determining, for any second partition, a first partition that matching the second partition from the plurality of first partitions corresponding to the first character;

inputting, for any second partition, a content encoding of the second partition and a attribute encoding of the first partition matching the second partition into the decoder to obtain the third character.

7. The method of claim 1, wherein inputting the fifth character, the sixth character, and the seventh character into the font generation network to obtain the target character comprises:

inputting the sixth character and the seventh character into the attribute encoder of the font generation network to obtain a sixth attribute encoding and a seventh attribute encoding, respectively;

mixing the sixth attribute encoding and the seventh attribute encoding to obtain a target attribute encoding, the target attribute encoding characterizing a new font attribute;

inputting the fifth character into the content encoder of the font generation network to obtain a target content encoding;

inputting the target attribute encoding and the target content encoding into the decoder of the font generation network to obtain the target character.

8. The method of claim 7, wherein inputting the fifth character into the content encoder of the font generation network to obtain the target content encoding comprises:

inputting the fifth character and the stroke encoding of the fifth character into the content encoder of the font generation network to obtain the target content encoding.

9. The method of claim 7, wherein mixing the sixth attribute encoding and the seventh attribute encoding to obtain the target attribute encoding comprises:

inputting the sixth attribute encoding and the seventh attribute encoding into a mixer of the font generation network to obtain the target attribute encoding.

10. An electronic device, comprising: a processor and a memory;

the memory is configured to store instructions or a computer program;

the processor is configured to execute the instructions or the computer program in the memory, to cause the electronic device to perform acts comprising:

obtaining a fifth character providing a font content and a character set providing font attributes, the character set comprising a sixth character and a seventh character, a font attribute of the sixth character being different from a font attribute of the seventh character, and a font attribute is configured to characterize a style of a font; and inputting the fifth character, the sixth character, and the seventh character into a font generation network to obtain a target character, a font content of the target character being the font content provided by the fifth character, a font attribute of the target character being determined by the font attribute of the sixth character and the font attribute of the seventh character;

wherein the font generation network is generated using training samples, the training samples comprise a first character and a second character, and a font attribute of the first character is different from a font attribute of the second character, wherein an initial network model corresponding to the font generation network comprises an attribute encoder, a content encoder, and a decoder, and a training process of the font generation network comprises:

inputting the first character into the attribute encoder to obtain a first attribute encoding, and inputting the second character into the content encoder to obtain a first content encoding, inputting the first attribute encoding and the first content encoding into the decoder to obtain a third character, inputting the second character into the attribute encoder to obtain a second attribute encoding, and inputting the third character into the content encoder to obtain a second content encoding, inputting the second attribute encoding and the second content encoding into the decoder to obtain a fourth character, adjusting parameters of the initial network model based on the font content of the second character and the font content of the fourth character, and adjusting the parameters of the initial network model based on the font attribute of the first character and a font attribute of the third character, and repeating the training process until a predetermined condition is satisfied to obtain the font generation network.

11. The electronic device of claim 10, wherein inputting the second character into the content encoder to obtain the first content encoding comprises:

inputting the second character and a stroke encoding corresponding to the second character into the content encoder to obtain the first content encoding, the stroke encoding characterizing a radical comprised in the second character.

12. The electronic device of claim 10, wherein adjusting parameters of the initial network model based on the font content of the second character and the font content of the fourth character comprises:

inputting the second character and the fourth character into a first discriminator, and adjusting the parameters of the initial network model based on a discrimination result of the first discriminator, the first discriminator being configured to discriminate a difference between the font content of the second character and the font content of the fourth character.

13. The electronic device of claim 10, wherein adjusting the parameters of the initial network model based on the font attribute of the first character and the font attribute of the third character comprises:

inputting the first character and the third character into a second discriminator, and adjusting the parameters of the initial network model based on a discrimination result of the second discriminator, the second discriminator being configured to discriminate difference between the font attribute of the second character and the font attribute of the fourth character.

14. The electronic device of claim 13, wherein inputting the fifth character into the content encoder of the font generation network to obtain the target content encoding comprises:

inputting the fifth character and the stroke encoding of the fifth character into the content encoder of the font generation network to obtain the target content encoding.

15. The electronic device of claim 10, wherein the acts further comprise:

inputting the third character into a stroke classifier to obtain the first stroke encoding; and adjusting the parameters of the initial network model based on the first stroke encoding and a second stroke encoding corresponding to the second character.

16. The electronic device of claim 10, wherein inputting the first attribute encoding and the first content encoding into the decoder to obtain the third character comprises:

performing character segmentation on the first character and the second character to obtain a plurality of first partitions corresponding to the first character and a plurality of second partitions corresponding to the second character;

determining, for any second partition, a first partition that matching the second partition from the plurality of first partitions corresponding to the first character;

inputting, for any second partition, a content encoding of the second partition and a attribute encoding of the first partition matching the second partition into the decoder to obtain the third character.

17. The electronic device of claim 10, wherein inputting the fifth character, the sixth character, and the seventh character into the font generation network to obtain the target character comprises:

inputting the sixth character and the seventh character into the attribute encoder of the font generation network to obtain a sixth attribute encoding and a seventh attribute encoding, respectively;

mixing the sixth attribute encoding and the seventh attribute encoding to obtain a target attribute encoding, the target attribute encoding characterizing a new font attribute;

inputting the fifth character into the content encoder of the
font generation network to obtain a target content
encoding;
inputting the target attribute encoding and the target
content encoding into the decoder of the font genera-
tion network to obtain the target character.
18. A non-transitory computer-readable storage medium
having instructions stored thereon which, when run on a
device, cause the device to perform acts comprising:
obtaining a fifth character providing a font content and a
character set providing font attributes, the character set
comprising a sixth character and a seventh character, a
font attribute of the sixth character being different from
a font attribute of the seventh character, and a font
attribute is configured to characterize a style of a font;
and
inputting the fifth character, the sixth character, and the
seventh character into a font generation network to
obtain a target character, a font content of the target
character being the font content provided by the fifth
character, a font attribute of the target character being
determined by the font attribute of the sixth character
and the font attribute of the seventh character;
wherein the font generation network is generated using
training samples, the training samples comprise a first
character and a second character, and a font attribute of
the first character is different from a font attribute of the
second character,

20 wherein an initial network model corresponding to the
font generation network comprises an attribute
encoder, a content encoder, and a decoder, and a
training process of the font generation network com-
prises:
inputting the first character into the attribute encoder to
obtain a first attribute encoding, and inputting the
second character into the content encoder to obtain a
first content encoding,
inputting the first attribute encoding and the first content
encoding into the decoder to obtain a third character,
inputting the second character into the attribute encoder to
obtain a second attribute encoding, and inputting the
third character into the content encoder to obtain a
second content encoding,
inputting the second attribute encoding and the second
content encoding into the decoder to obtain a fourth
character,
adjusting parameters of the initial network model based
on the font content of the second character and the font
content of the fourth character, and
adjusting the parameters of the initial network model
based on the font attribute of the first character and a
font attribute of the third character, and repeating the
training process until a predetermined condition is
satisfied to obtain the font generation network.

* * * * *